Aug. 16, 1955 E. H. CARRUTHERS 2,715,490
FILLING MACHINE
Filed Dec. 12, 1951 5 Sheets-Sheet 4

INVENTOR.
EBEN H. CARRUTHERS
BY

Aug. 16, 1955 E. H. CARRUTHERS 2,715,490
FILLING MACHINE
Filed Dec. 12, 1951 5 Sheets-Sheet 5

INVENTOR.
EBEN H. CARRUTHERS
BY
Winslow Thomson

United States Patent Office 2,715,490
Patented Aug. 16, 1955

2,715,490

FILLING MACHINE

Eben H. Carruthers, Warrenton, Oreg.

Application December 12, 1951, Serial No. 261,269

25 Claims. (Cl. 226—101)

My invention relates to a machine for packing materials or products in cans, glass jars or other containers.

The broad principles of the machine of my invention may be applied to the packing of green beans, carrots, peas, beets, turnips, tomatoes, potatoes, corn, onions, spinach, asparagus, cauliflower, brussels sprouts, rhubarb, cabbage, kraut, various fruits, whole or sliced pickles, spaghetti and certain non-food products. The principles of the machine of my invention may be also applied to the packing of various vegetables and fruits in cardboard or other containers in which the vegetables or fruits may be frozen.

The specific machine shown herein may require some modification or rearrangement of the parts to adapt it for all the purposes set forth above. However, the broad principles of my invention may have general application to the fields above set forth, the embodiment shown herein being specifically designed for the purpose of packing whole green beans, the packing of which has in particular presented a problem to the food packing industry. In the past whole green beans have been packed by hand with a considerable amount of physical effort and considerable expense for labor. The physical effort and expense involved in packing whole green beans has resulted in most canners preferring to can beans in a cut state, even though whole green beans, particularly when they are canned whole in their young and tender condition command a price premium on the market.

More recently a machine has been developed for canning whole green beans which has attained some commercial usage. However, the machine is complicated, expensive to build, and produces a pack which is objectionable from the standpoint that a considerable percentage of the beans are crushed when the compression jaws are moved to a closed position. Moreover, the beans on the top of a can, because they are not confined below the lip of the can, are sometimes crushed when the can closure is applied.

An object of my invention is to provide a machine, the broad principles of which may be applied to the packing of a comprehensive list of vegetables, fruits and other products, the machine being simple in construction and economical to build.

Another object of my invention is to provide a series of pockets or gathering, forming and compression units which rotate about an axis and move from an open expanded position to a closed contracted position to compress the materials to the cross-sectional shape of the container in which the materials are to be packed, the machine including a hopper together with means for intermittently operating or opening the hopper to deposit an approximately measured quantity of material in each of the series of pockets as they pass beneath the hopper.

Another object of my invention is to provide a conveyor having a plurality of material-carrying buckets together with means in connection therewith whereby an operator with experience may fill each bucket with a charge of material corresponding substantially to the weight of material to be placed in each container, the material in each bucket being separately deposited in a hopper provided with a valve, the operation of which is coordinated and timed with relation to the operation of other parts of the machine so that successive batches or buckets full of materials are deposited successively in each of successive pockets which have movable parts adapted to compress and form the material into the desired shape for placementt into a can or other container.

Still another object of my invention is to provide a filling machine for use in filling a wide range of materials into containers, the machine including a series of material-forming pockets having movable jaws or chucks operated by a simple cam arrangement whereby a jaw or jaws are first moved to gather the material prior to exerting any pressure thereon and after the material has been gathered, a compression jaw or jaws move to a closed position to form and compress the material into the cross-sectional shape of the container in which the material is to be packed.

My invention further contemplates the provision of a material forming pocket movable from an open expanded material receiving position to a closed contracted material-forming and compressing position, the pockets including a relatively fixed jaw or chuck and at least two movable jaws or chucks, one of said movable jaws moving toward a closed position to gather the material and form a compression space of substantially larger volume than the material is ultimately to occupy so that crushing of the product is avoided and another jaw moves to a closed position to form and compress the material into the cross-sectional shape of the container which the material is to occupy after the material has been gathered, the action of said latter jaw or chuck in cooperation with the other jaws of the pocket being such as to avoid any crushing of the material during the formation of the slug or charge of material to be deposited in the container.

Other objects and advantages of my invention will be set forth in the claims and will be apparent from the following description, when taken in connection with the accompanying drawings, in which:

Figures 2, 12:
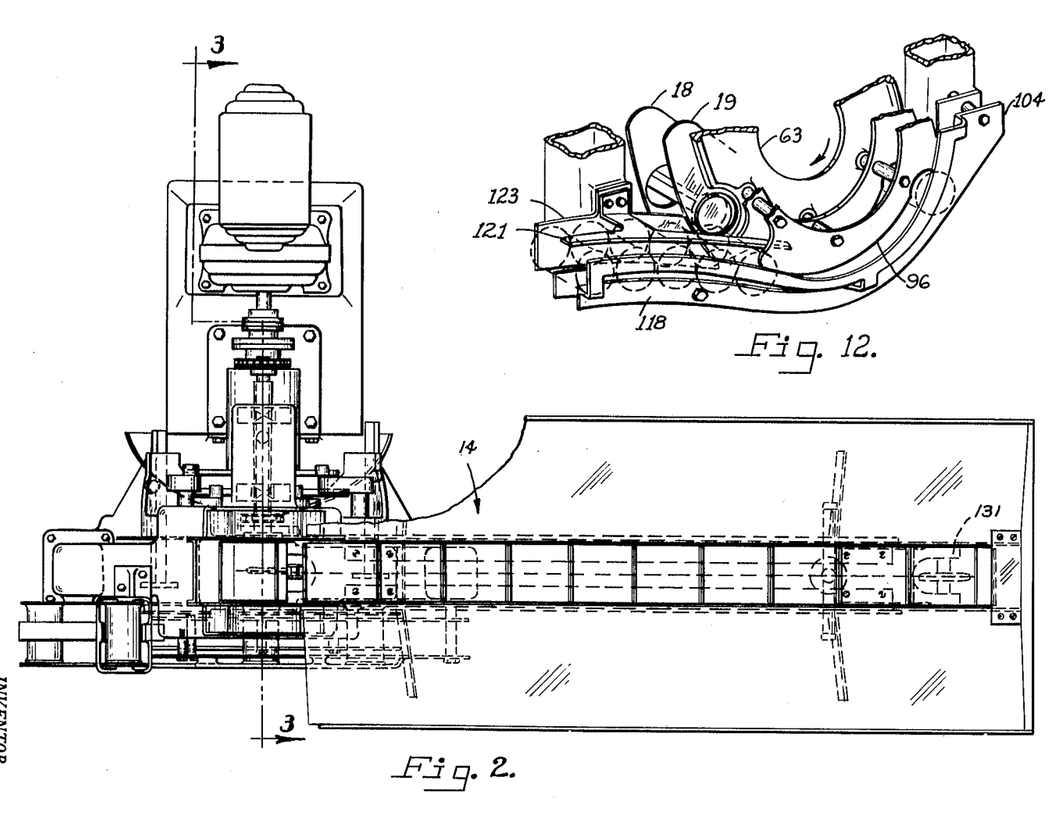
Fig. 2 is a top plan view thereof.
Fig. 12 is a perspective view of the guiding elements for the filled cans as they move toward their point of exit from the machine, the view being generally from the side of the machine as shown in Fig. 1.
Figures 3, 7:
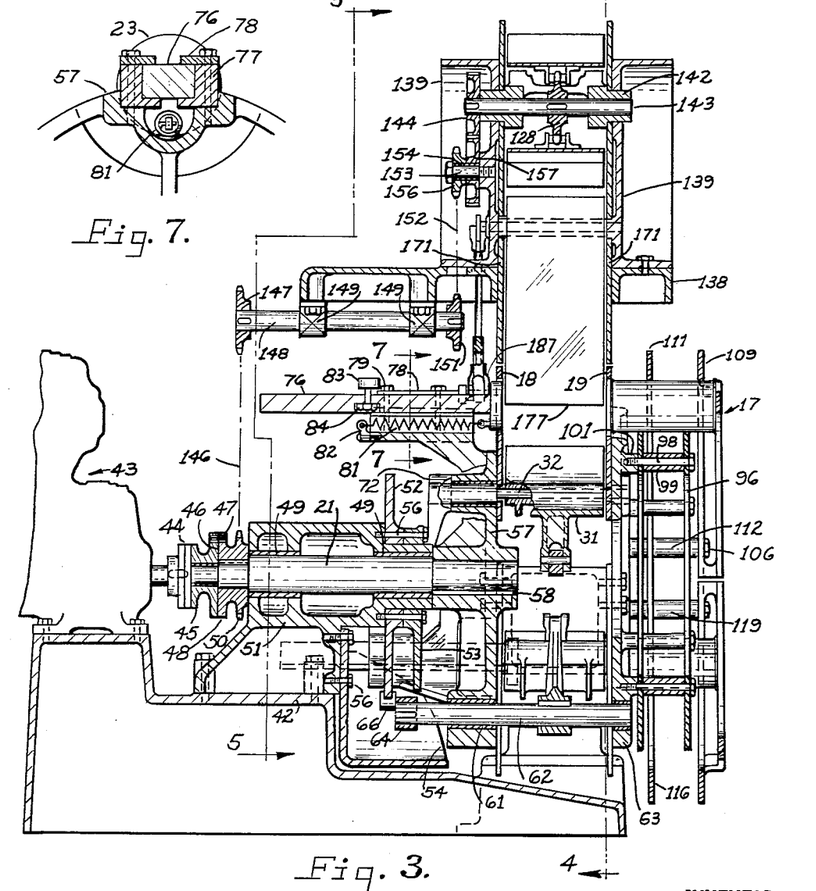
Fig. 3 is a vertical sectional view taken substantially on the line 3—3 of Fig. 2 in the direction indicated by the arrows.
Fig. 7 is a sectional view taken substantially on the line 7—7 of Fig. 3 in the direction indicated by the arrows.

The filling machine of my invention comprises a series of rotatable product gathering, forming and compression units generally indicated by the numeral 13 (Fig. 4); a conveyor assembly generally indicated by the numeral 14 (Figs. 1 and 2); a hopper unit generally indicated by the numeral 16 for the reception of the material from the conveyor assembly 14 prior to deposit of a charge of material into the gathering, forming and compression units 13; and container handling and conveying mechanism generally indicated by the numeral 17 (Fig. 3).

The product gathering, forming and compression units 13 will first be described since they constitute perhaps the most important aspect of my invention and since the principles of such units are capable of general application. In the specific embodiment shown in this application, I have developed a machine particularly suited for filling whole string beans in cans or other containers. The specific machine shown herein may also be suitable for packing other products included in the list above set forth. However, the material gathering, forming and compression units 13 may be embodied in several types of machines for packing other products above enumerated.

The material gathering, forming and compression units 13 (Figs. 8A to 11B inclusive) each comprises a pair of side plates 18 and 19. The side plates 18 and 19 are stationary relative to some other parts of the material gathering, forming and compression units 13 but are rotatable as a part of a unit rotating about a central preferably horizontal axis which is the drive shaft 21 (see Fig. 3). The side plates 18 and 19 are each provided with a cylindrical opening 22. One of these openings is normally closed by a plunger 23 and the opening in the other side plate is normally closed by a container 24 to be filled. In the drawings I have shown the machine in use in connection with filling cylindrical cans 24 but it will be understood that glass or other containers such as cardboard boxes for packing vegetables or fruits for freezing may be substituted for the cans 24 with suitable modification of the container handling and conveying mechanism 17. When the machine is employed for filling a rectangular, oval or square container, of course the openings 22 in the side plates 18 and 19 and the plunger 23 will be changed to conform to the shape of the container to be filled.

The material gathering, forming and compression units 13 include a relatively fixed jaw or chuck element 26 which is rigid with the side plates 18 and 19. The relatively fixed chuck element 26 has a straight relatively wide side wall 27 which terminates adjacent its upper end, as viewed in Fig. 8B, in a part 28 which is a semi-cylinder. This semi-cylindrical part 28 is in alignment with the openings 22 in the side plates 18 and 19.

Figure 8A:
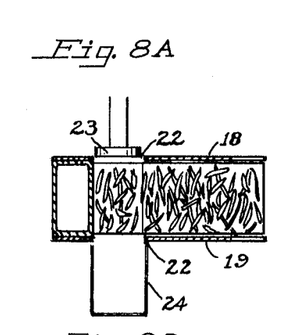
Figs. 8A and 8B are views of the forming pockets in their expanded material receiving position, Fig. 8A being a sectional view and Fig. 8B being a view with one of the forming pocket side plates removed to show the construction of the forming jaws or chucks.
Figure 8B:
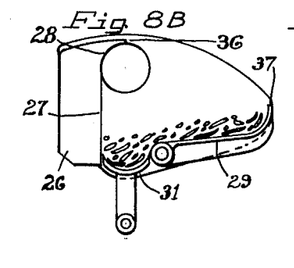
Figure 10A:
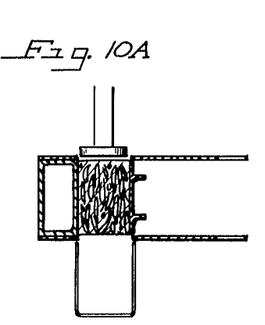
Figs. 10A and 10B are views similar to Figs. 8A and 8B showing the movable forming or compression jaw or chuck moved to a closed position.
Figure 10B:
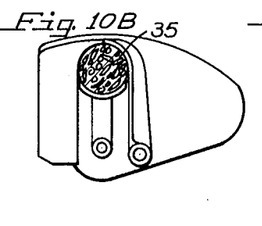
Figure 11A:
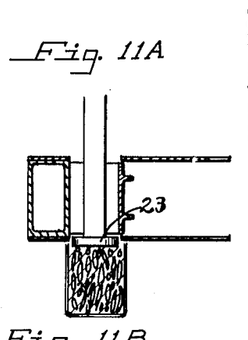
Figs. 11A and 11B are views similar to Figs. 8A and 8B showing the action of the plunger while the gathering jaw and the forming jaw are in their closed contracted position, in pushing or depositing the material in the container.
Figure 11B:
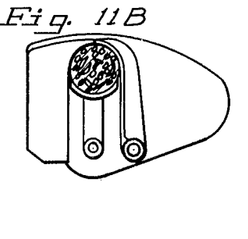

A pair of movable jaw or chuck elements 29 and 31 are movable between the side plates 18 and 19 from an expanded or open position as shown in Figs. 8A and 8B to a contracted or closed position in which the material is first gathered and thereafter formed and compressed. In Figs. 10A and 10B, I have shown the gathering, forming and compression units in their closed or contracted position, the slug or charge of material to be deposited in the container being shown at 35. In Figs. 11A and 11B, I have shown the plunger 23 in the position it occupies after it has deposited or pushed the formed and compressed slug or charge of material into the container 24.

The movable chuck element 29 moves between the side plates 18 and 19 about a fixed axis, the shaft 32. This movable chuck element 29 moves in close substantially contiguous relationship to the side plates 18 and 19, the clearance shown being exaggerated for illustration purposes. The movable chuck element 29 has a straight side wall 33 which terminates at its free end in a semi-cylindrical portion 34 which corresponds to the curvature of the container in which the material is to be packed.

Figure 4:
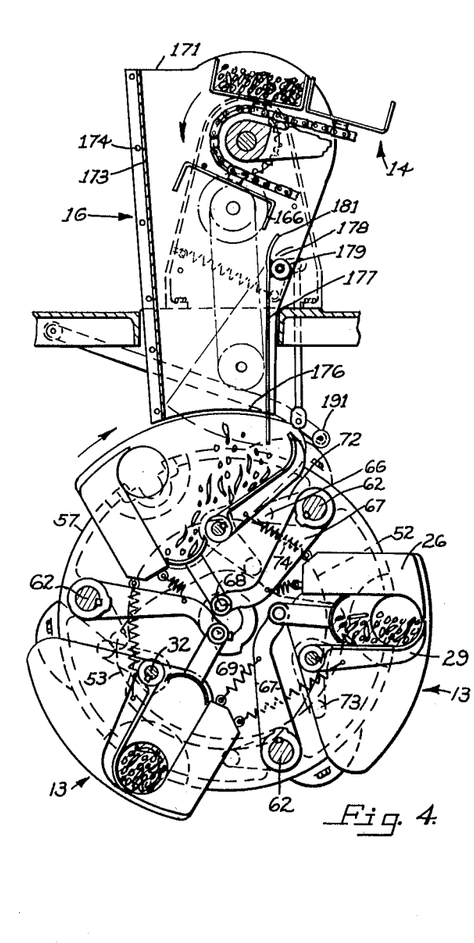
Fig. 4 is a view partly in section taken substantially on the line 4—4 of Fig. 3 in the direction indicated by the arrows and taken just inside the forming pocket side plates.

Referring now to Fig. 4, the gathering, forming and compression units are shown either in their open or expanded condition or in a partly contracted position with the unit in the uppermost position fully open and being filled with materials to be packed, in this case, whole green beans. As will presently appear, an approximately measured quantity of material drops by gravity from the hopper unit 16 into the gathering, forming and compression unit 13 and thereafter as each unit 13 rotates about the shaft 21, it is filled with material and after filling the movable jaws or chuck elements 29 and 31 are moved to a closed position.

Figure 9A:
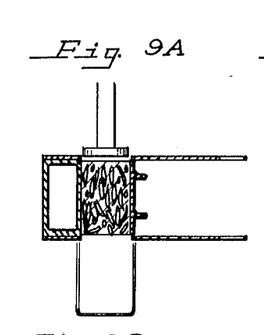
Figs. 9A and 9B are view similar to Figs. 8A and 8B with one of the movable jaws or chucks moved to a closed position to gather the material.
Figure 9B:
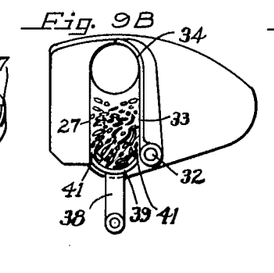

The successive positions of the movable chuck elements 29 and 31 are shown in Figs. 9B and 10B. During the movement of the parts from that shown in Figs. 8A and 8B to that shown in Figs. 9A and 9B, the movable chuck element 29 moves counterclockwise about the pivot 32 toward the fixed chuck element 26. During this movement the string beans are subjected to what may be termed a "gathering operation." No compression of the product occurs. It will be appreciated that the movable chuck element 29 moves in close relationship to the side plates 18 and 19 so that beans cannot be caught in the slight clearance which exists between the movable chuck element 29 and the side plates.

As shown in Fig. 4, the movable chuck element 29 reaches its closed position somewhat prior to the time the unit 13 at the right of Fig. 4 reaches the position shown in that view. Thus, as the movable chuck element 29 closes, it tends to gather and sweep the beans into the bottom of the unit 13 so that the beans mound on top of the movable chuck elements 31 as illustrated in Fig. 9B. As a filled unit moves from the uppermost position of Fig. 4 to a position toward that at the right of Fig. 4, the parts, particularly the movable chuck 29, are positioned so that gravity aids the gathering effect. The gathering effect of the movable chuck element 29, together with the assistance of gravity, insures that beans will not be caught between the end 36 of the relatively fixed chuck element 26 and the end 37 of the movable chuck element 29 as these parts reach the closed position shown in Fig. 9B. It will be particularly noted that when the parts are in the position shown in Fig. 9B, the volume of the pocket formed is several times as large as that ultimately to be available for the beans (Fig. 10B) and the beans lie loosely adjacent the bottom of the pocket.

Continued rotation of the gathering, forming and compression units 13 about the shaft 21 results in a manner, presently to be described, in the movable jaw or chuck element 31 moving from the position shown in Figs. 8B and 9B to that shown in Fig. 10B. As shown in Fig. 4, the movable chuck element 31 of the unit 13 at the right of that figure has moved partly toward a closed or contracted position. Continued rotation of the right hand unit 13 (Fig. 4) will bring the parts into the position shown in Fig. 10B.

The movable chuck element 31 has a depending leg 38 by which it is actuated as will presently appear and the inner surface 39 thereof is semi-cylindrical and complementary to the semi-cylindrical parts 28 and 34 of the fixed and movable chuck elements 27 and 29 so that the three chuck elements form a complete cylinder about the material to be packed preferably slightly smaller than the diameter of the container to be filled.

It will be particularly noted that when the movable chuck element 29 is in its contracted or closed position, the straight side walls 27 and 33 respectively of the fixed chuck element 26 and the movable chuck element 29 form guides for the side edges 41 of the forming and compressing chuck element 31. The clearances between these side edges 41 and the side walls 27 and 33 are extremely small so that beans cannot become lodged in these clearances and thus become crushed or broken. When the movable chuck element 31 reaches the closed or contracted position shown in Fig. 10B, the material, in this case whole green beans, is formed and compressed into a slug or charge of beans for deposit in the container to be filled.

In the next operation after a chuck has been completely closed, the plunger 23 is moved through the openings 22 in the side plates 18 and 19 and through the then closed chuck or unit 13 to deposit or force the slug of beans into the can or other container to be filled.

Referring now to Fig. 3, the machine frame 40 (Fig. 1) of my invention is mounted on a bed plate 42. A pedestal of the bed plate 42 supports a prime mover generally indicated by the numeral 43. While a conventional constant speed motor drive may be employed, I preferably provide the variable speed drive shown because it is desirable that the filling unit be synchronized in operation with other units in a processing line such as a blancher or can closing machine. On the extended end of the variable speed motor drive is a flexible coupling 44, the driven element 45 of the coupling having a flange formed at its opposite end as shown at 46. A matching flange 48 is secured rigidly to the shaft 21. The coupling element 45 is restrained from turning freely on the shaft 21 by a shear pin 47 which locks coupling 45 with flange 48. Formed integral with flange 48 is a sprocket 50.

The shaft 21 is supported in bearings 49 carried in a bore formed in a pedestal 51 supported from the bed plate 42. Three cams 52, 53 and 54 are supported from the pedestal 51 in any suitable manner as by screws 56. The cams and their contours will be more particularly described later.

A rotatable support or head 57 is keyed to the drive shaft 21 as shown at 58, this rotatable support head carrying the gathering, forming and compression units 13 previously described. This rotatable support head also carries the plungers 23 and the container handling and conveying mechanism 17 as will presently appear.

The rotatable support head 57 is provided with suitable bushed bores 61 (Fig. 3) for rotatably supporting shafts 62. As shown in Fig. 4, three shafts 62 are provided corresponding in number to the number of gathering, forming and compression units 13. It will be understood, of course, that the number of units 13 may be increased if so desired which of course would require an increase in the actuating parts thereof. The shafts 62 extend to the right, as viewed in Fig. 3, and are rotatably secured in bushings provided in an annular rotatable plate 63.

Figure 5:
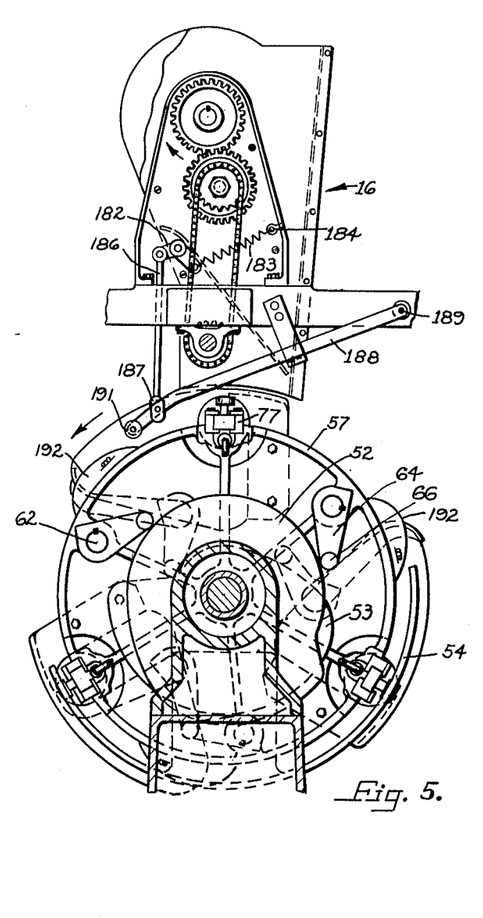
Fig. 5 is a view partly in section taken substantially on the line 5—5 of Fig. 3 in the direction indicated by the arrows.

As shown most clearly in Figs. 3 and 5, on the rearward end of each of the shafts 62 and rigidly secured thereby as by keying is a crank 64. Each of the cranks has a roller 66 mounted thereon which rides on the cam 52. As shown most clearly in Fig. 4, an arm 67 is keyed to the forward end of each of the shafts 62 which is pivoted as shown at 68 to the depending leg 38 of the movable, forming and compression jaw of chuck element 31. A spring 69 is secured at one end of each of the arms 67. The other ends of the springs 69 are secured to relatively fixed but rotatable parts of the machine such as the relatively fixed jaws of the gathering, forming and compression units 13.

It will now be understood that the springs 69 retain the movable, forming and compression chuck elements 31 in a retracted or expanded position and cause the rollers 66 to ride on the cam 52. Thus the movable, forming and compression chuck elements 31 move from an open expanded position to a closed retracted position and return to normal position in accordance with the contour of cam 52 and under the control of the springs 69.

The movable gathering jaw or chuck element 29 is rigidly secured to the shaft 32 as by keying. As previously mentioned, the chuck element 29 lies between the side plates 18 and 19 and the shaft 32 extends through bores in these side plates (see Fig. 3). As shown most clearly in Fig. 3, the shaft 32 extends rearwardly and has an arm 72 rigidly secured thereto upon the end of which a roller 73 (Fig. 4) is rotatably mounted. This roller rides on the cam 53 so that the gathering chuck element 29 is actuated in accordance with the contour of the cam 53. Each gathering chuck element 29 has a spring 74 secured thereto, the other end of each of the springs being secured to a relatively fixed but rotatable part of the machine such as the fixed chuck elements 26. The springs 74 normally hold the gathering chuck elements in the expanded position illustrated in Fig. 8A.

The contours of the cams 52 and 53 are such that the gathering chuck element 29 moves to the closed position shown in Fig. 9B, preferably before movement of the forming and compression chuck element 31 is initiated. Thus, prior to movement of the forming and compression chuck 31, guides are formed by the straight sides of a fixed chuck element and the movable gathering chuck element 29 in which the forming and compression chuck element 31 may ride during forming and compression of material.

As previously mentioned and as shown in Fig. 11A, the plunger 23 after the slug or charge of material to be packed has been formed, deposits or pushes the material into the can or other container. As shown most clearly in Figs. 3 and 7, the plunger 23 is secured to a plunger rod 76 which is preferably rectangular in cross-section. The plunger rod 76 rides in guides or slides 77 formed in a part of the casting or support head 57. Caps 78 held in position by screws hold the plunger rod 76 in its guides 77. A spring 81 having one end secured to the plunger 23 or its rod 76 has its other end secured to a relatively fixed but rotatable part of the machine such as a lug 82 (Fig. 3) secured to the casting or support head 57.

A roller 83 secured to the plunger rod 76 as shown at 84 rides on the cam 54, the spring 81 normally holding the plunger 23 in retracted position (see Fig. 3) and causing the roller 83 to continuously maintain contact with the cam 54. The contour of the cam 54 is such that the plunger is actuated to discharge or push the slug or charge of material into the can or other container when the parts reach a position approximately midway between the position shown for the two lowermost units 13 as they appear in Fig. 4.

Figures 1, 6:
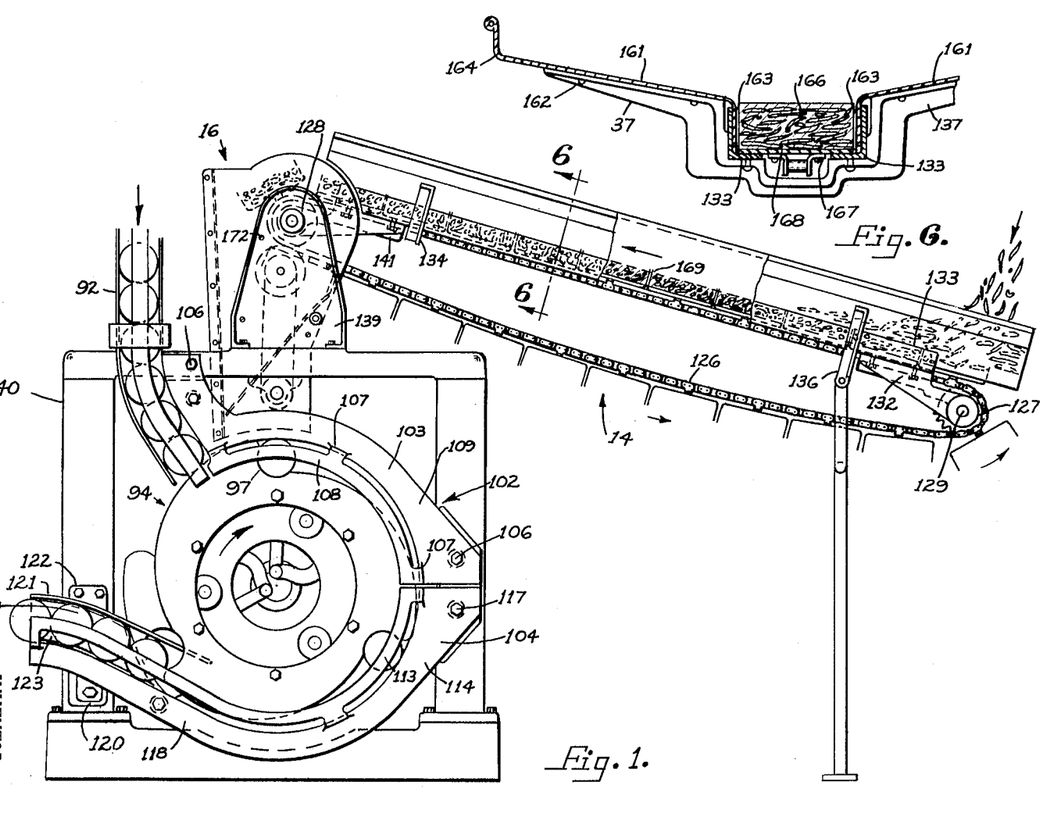
Fig. 1 is a front elevation of the packing machine of my invention showing the conveyor for the vegetables to be packed, the hopper, the can chute for bringing cans to be filled to the machine and the filled can discharge.
Fig. 6 is a sectional view taken substantially on the line 6—6 of Fig. 1 in the direction indicated by the arrows.

The container handling and conveying mechanism, generally indicated by the numeral 17, is shown most clearly in Figs. 1 and 3. The cans are delivered to the machine by means of a can chute 92 from a can loft (not shown). The lower end of the can chute 92 lies in close proximity to a rotatable container turret, generally indicated by the numeral 94. The can turret 94 comprises a pair of annular plates 96 having in this case three can or container pockets 97 formed therein (Fig. 1). As the can pockets 97 rotate beneath the end of the can chute 92, the cans successively drop in the pockets and are locked in position in the pockets as they rotate through the machine.

The can turret 94 is connected to the rotatable plate 63 by means of screws 98 (Fig. 3). Suitable spacing sleeves 99 are provided to properly space the two annular plates 96 forming the container turret 94. Projecting bosses 101 on the annular rotatable plate 63 are provided to space the inner annular plate 96 from the plate 63.

The can handling and conveying mechanism 17 also includes can guides, generally indicated by the numeral 102 (Fig. 1). The can guides 102 comprise a pair of sheet metal or light weight casting parts 103 and 104.

The part 103 or upper can guide is rigidly secured by means of screws 106 to the frame of the machine. The sheet 103 is cut out to facilitate bending at the points 107 to form an annular part 108 against which the ends of the cans ride as they are moved through the machine. Thus the containers are prevented from shifting endwise in the pockets of the can turrets 94. The part 109 extends around and contacts the sides of the cans as they are moved through the machine as shown in Fig. 3. The upper can guide 109 also includes an annular sheet metal part 11 which is carried by the screws 106, the parts being spaced by spacing sleeves 112 mounted on the screws 106.

The lower can guide 104 is similar to the upper can guide just described and includes an end shield guide 113, a side shield or guide 114 and a sheet metal side shield part or guide 116. The parts are assembled relative to each other and secured to the frame of the machine by screws 117, the screws having spacing sleeves 119 mounted thereon.

The can guides above described terminate adjacent their lower end in a discharge chute 118 which may be connected to a conveyor or any other suitable means for conveying the filled containers to an inspection table and finally to a machine for applying closures to the containers and sealing such closures. The lower part of the can guide and more specifically the can discharge chute portion thereof 118 is secured to the frame by means of a bracket and screw as shown at 120. The discharge chute 118 also includes a guide 121 which lies adjacent the sides of the cans and is carried by a bracket attached to the frame of the machine as shown at 122 and a backing plate 123 which lies adjacent to the open end of the filled cans. It will be particularly noted that the material in the can will be retained by the plunger 23, through a dwell in the contour of the cam 57 until the transfer of the can from the rotating turret to the fixed can exit track takes place. As the can passes out of the turret the rotatable but relatively fixed plate 19 and the fixed plate 123 act to retain the contents of the can while it lies in a horizontal position.

The can guides as thus above described are made up in two sections, each of which may be separately removed from the frame without disturbing the other section thereof to facilitate removal of a can in case it becomes jammed in the machine. Thus if a can becomes jammed in the lower part of the machine, access to the jammed can for removal thereof may be quickly obtained by removing the screws 117 and removal of the screws holding the bracket 120 in position.

The conveyor assembly (Fig. 1) comprises a chain 126 which extends over an idler sprocket 127 and a driving sprocket 128 (see Fig. 3). The idler sprocket 127 is rotatably mounted on a shaft 129 which is rigidly mounted in the bifurcated end 131 of a support bracket 132. The upper wall of the support bracket is channel shaped as indicated at 132 and is welded or otherwise secured to a pair of angle irons 133 (see Fig. 6) which extend longitudinally of the conveyor.

As shown in Fig. 6, the inwardly extending flanges of the angle irons 133 are spaced apart to accommodate the chain 126. The angle irons 133 are welded or otherwise secured to a pair of saddles 134 and 136. These saddles have outwardly extending arms 137 for a purpose which will later appear.

Referring now to Fig. 3, the top wall 138 of the main frame carries a pair of side stands 139. A support bracket 141 similar to the support bracket 132 is provided for the hopper end of the conveyor. This support bracket 141 is also welded or otherwise secured to the angle irons 133. The support bracket 132 has bifurcated ends 142 which are bored (Fig. 3), for the reception of a shaft 143 which carries the driving sprocket 128. As shown in the drawings, the driving sprocket 128 and a gear 144 are keyed to the shaft 143 and the shaft is rotatable in the bores in which it is mounted.

The sprocket 50, mounted on the main shaft 21 (Fig. 3), drives a chain 146 which passes over a sprocket 147 keyed to a shaft 148. The shaft 148 is supported in bearings carried by bearings brackets 149 dependently secured from the under side of the top wall 138 of the main frame. The other end of the shaft 148 has a sprocket 151 keyed thereto which drives the chain 152. Mounted in one of the side stands 139 and rigidly secured thereto is a stub shaft 153 which has a sleeve 154 rotatable thereon. A sprocket 156 rigid with the sleeve is driven by the chain 152 and through the sleeve 154 drives a gear 157 which meshes with the gear 144. It will be appreciated that since the conveyor chain 126 is driven from the main shaft 21 which drives and actuates the gathering, forming and compression units 13, the conveyor is driven in timed relation thereto, the importance of which will later appear.

As shown most clearly in Figs. 1 and 6, the saddles 134 and 136 have apron members 161 secured thereto as by riveting as shown at 162. Each of the apron members has downwardly turned parts 163 which lie inwardly of the upwardly extending flanges of the angle irons 133. The walls of the apron members 161 slope inwardly and are turned upwardly at their outer ends 164 so that a complete apron or trough is formed extending substantially the full length of the conveyor to the end that material deposited on or accidentally being dropped upon the apron tends to move by gravity toward the conveyor.

The downwardly turned parts 163 of the apron members 161 together with the bottom flanges of the angle irons 133 form a trough in which a plurality of buckets 166 are moved by the conveyor. As shown in Figs. 1 and 6, some of the links of the chain 126 are provided with outwardly extending flanges 167 to which the bottom walls 168 of the buckets 166 are riveted or otherwise secured. The buckets 166 include the bottom wall 168 which rides on the bottom flanges of the angle irons 133 and have upwardly extending walls 169. The upwardly extending walls 169 of adjacent buckets are contiguous to each other when they are on the upper run of the chain and slide over the bottom flanges of the angle irons 133 as appears clearly in Figs. 1 and 6.

It will be particularly observed that as the buckets 166 pass around the sprockets, the buckets separate from each other and, for example, at the driving sprocket end each bucket in effect separately rotates through 180 degrees and dumps its charge of material into the hopper unit 16.

The hopper unit 16 includes a pair of sheet metal side walls 171 (Fig. 3) which are secured by screws 172 to the side stands 139 (Fig. 1). The hopper also includes a rear wall 173 which is flanged and secured by screws or rivets 174 to the side walls 171.

The front or conveyor side of the hopper is open so that the buckets of the conveyor may freely enter the hopper, make their 180 degree turn and pass out of the hopper. The bottom 176 of the hopper is open as well as the top thereof, the bottom being normally closed by a closure plate or valve 177. The valve 177 is rigidly secured, as shown at 178, to a shaft 179. The valve serves not only normally to close the bottom of the hopper but also constitutes in part the forward wall of the hopper.

The upper end 181 of the valve extends to a position such that when the buckets 166 pass outward from within the confines of the hopper, the buckets just clear the upper end 181 of the valve so as to prevent any possibility of dumping material to be packed outside the hopper. It will be particularly noted from Fig. 4 that the buckets are substantially completely inverted while they lie inside the hopper and, as viewed in that figure, when they are in a position to the left of the valve 177. It will further be noted from Fig. 4 that the next succeeding bucket does not start to dump its load until the bucket in the dumping position of Fig. 4 has been inverted and completely emptied.

A bell crank 182 is rigidly secured to the shaft 179 as shown most clearly in Fig. 5. A spring 183 has one end secured to one arm of the bell crank 182, the other end of the spring being secured, as shown at 184, to one of the side stands 139. The other end of the bell crank is pivoted to a rod 186 which extends downward and has its lower end bifurcated as indicated at 187 (Fig. 3). The bifurcated end 187 is pivoted to an actuating arm 188 (Fig. 5) which is pivoted as shown at 189 to the top wall of the main frame. The other end of the actuating arm 188 has a roller 191 mounted thereon which is adapted to be engaged successively by each of three cams 192 mounted on the rotatable support head 57.

As will be clear from the above, the spring 183 normally holds the valve 177 in a closed position bridging the open bottom of the hopper. Since the conveyor is driven in timed relation to the rotation of the rotatable support head 57 and the actuation of gathering, forming and compression units 13, the roller 191 is engaged successively by cams 192 in timed relation to the operation of other parts of the machine. Thus, the rod 186 is raised upward from the position shown in Fig. 5 at the proper time to open the valve 177 and discharge the material in the hopper so that it drops by gravity into one of the open gathering, forming and compression units 13.

In Fig. 4, I have shown the position of the parts just after the valve 177 has been opened by engagement of the roller 191 with a cam 192. In this position of the parts, one of the gathering, forming and compression units 13 is in substantially its uppermost position and the chuck elements thereof are in their fully retracted or open position so as to receive the material from the hopper. It will further be particularly noted that one of the conveyor buckets is substantially completely inverted so that it will completely empty. As soon as the roller 191 rides off the cam which is just subsequent to the position of the parts shown in Fig. 4, the valve 177 closes, the inverted bucket of Fig. 4 passes out of the confines of the hopper and the next material bucket begins to dump its material into the hopper, awaiting the next opening of the valve 177. Thus the material contained in each conveying bucket is batch dumped into the hopper and the contents of no two buckets or portions thereof can be in the hopper at the same time.

From the foregoing, it is believed that the operation of my novel filling machine will be clear. One or more operators stand adjacent the conveyor and the control for the variable speed motor is adjacent their station. Material, such as whole or cut string beans, is deposited in the buckets of the conveyor. This material may be deposited on the conveyor directly, for example, from the discharge of a blancher. The operator by drawing her hands downward across the tops of the buckets against the direction of their movement may readily fill each bucket with substantially the same quantity of beans. A reasonable amount of practice enables the operator to fill each bucket with substantially the correct weight of beans to be placed in each container.

The contents of each bucket is separately and successively deposited in the hopper. As each gathering, forming and compression unit 13 reaches its uppermost position, the chuck elements thereof are open and the hopper valve is opened to deposit a substantially measured charge of material into the unit. Thereafter, and upon continued rotation of the rotatable support head 57, the hopper valve is closed, the gathering chuck element 29 is closed and thereafter the forming and compression chuck element 31 is closed. In the meantime containers are automatically delivered to the machine and prior to filling each unit 13 a container closes the opening 22 in the plate 19. The opening 22 in the plate 18 is always closed by the plunger 23. When the compression unit is fully closed, the plunger is actuated to force the compressed slug or charge of material into the container. As each filled container is discharged by the container turret, the force of discharge rolls a container out of the machine (Fig. 1). The machine is preferably provided with means (not shown) for turning the cans to a position open side up for inspection, salting, and applying closures.

At any time the operator may vary the speed of the entire operation to coordinate the machine with other elements of the production line or to maintain an excess of product in the conveyor. As will be apparent, the lower end of the conveyor always should have an excess of material, the excess material being brushed downward out of the rising buckets into successive lower buckets to maintain a substantially constant fill of the buckets.

While I have described the machine of my invention, it will be apparent that various changes and modifications may be made therein, particularly in the form and relation of parts, without departing from the spirit of my invention as set forth in the appended claims.

I claim:

1. A machine for packing materials in a container comprising, in combination, a rotary pocket carrying member, means for rotating said pocket carrying member, a material receiving pocket carried by said member, said pocket comprising a pair of side plates and at least two elements movable between said side plates from an extended position in which the pocket is of maximum capacity to a contracted position in which the pocket is approximately of the diameter of the container in which the material is to be packed, and means for moving said elements.

2. A machine in accordance with claim 1 in which one of the movable elements is moved substantially to its contracting position before the other movable element starts toward its contracting position.

3. A machine in accordance with claim 1 in which the side plates each have an opening with the openings being in alignment with each other, a piston rotating with said pocket carrying member and normally closing one of said openings and a container rotating with said pocket carrying member and normally closing the other of said openings.

4. In a machine for packing materials in a container, the combination of a plurality of pocket forming members, each of said members having at least a portion thereof which in section conforms to the cross-sectional shape of the container which the material is to occupy, means for rotating said pocket forming members about an axis, and means for moving at least two of said pocket forming members independently of their rotational movement to and from a position in which the pocket is contracted, said last mentioned means including elements for timing the movements of said movable pocket forming members so that one of said members moves towards contracted position and acts to gather the material into a smaller cross-sectional area before the other starts towards its contracted position, said other member moving to its contracted position after the material has been gathered and compacting the material into a shape corresponding in section to the cross-sectional shape of the container which the material is to occupy.

5. A machine in accordance with claim 4 in which the movable pocket forming members are movable between side plates which rotate with the pocket forming members.

6. A machine in accordance with claim 4 in which the axis of rotation of the pocket forming members is horizontal and the pocket is fully open when the pocket is adjacent its uppermost position so that material may drop into the pocket by gravity.

7. In a machine for packing materials in a container the combination of three pocket forming members for gathering and shaping the material after it has been deposited in the pocket to form the material into a cross-sectional shape corresponding to the cross-sectional shape of the container which the material is to occupy, one of said pocket forming members being stationary relative to the other two and having a straight side wall which terminates in a portion contoured in accordance with a part of the periphery of the container, the second of said members having a straight side wall which terminates in a portion contoured in accordance with a part of the periphery of the container, means for moving said second member toward said first member to gather the material, the third of said pocket forming members having a portion contoured in accordance with a part of the periphery of the container, and means for moving said third member with its edges in contiguous relation to the straight sides of said first two members after said second member has moved toward closed position, said third member in cooperation with the contoured parts of said first two members compressing the material into substantially the shape of the container.

8. A machine in accordance with claim 7 in which the movable pocket forming members move between and in contiguous relation to a pair of side plates and in which the pocket forming members together with the side plates are rotated about a central axis.

9. A machine for packing materials comprising, in combination, a drive shaft, a unit rotatable with and by said shaft, said rotatable unit including a plurality of sets of pocket forming members and a container turret, stationary means for enabling access of empty containers to the container turret and the discharge of filled containers from said turret, a pair of stationary cams, each of said sets of pocket forming members including at least two members movable from a pocket expanded position to a pocket contracted position, and means including elements extending between each of said movable pocket forming members and said cams for actuating each of said movable pocket forming members.

10. A machine in accordance with claim 9 in which the rotatable unit carries a plunger for each set of pocket forming members, and means are provided for actuating said plungers to discharge material from said pockets into the containers after the pocket forming members have moved to a contracted position.

11. A machine in accordance with claim 9 in which the drive shaft is horizontal, a hopper having a closure is located above the path of rotation of the pocket forming members, means are provided for discharging in timed relation to the rotation of the pocket forming members successive batches of material into the hopper with each batch being the approximate quantity of material to be placed in a container, and means including cam elements on the rotatable unit are provided for opening the closure in timed relation to the presentation of the expanded pockets successively beneath the hopper and closing the closure after each batch has been deposited in a container.

12. A machine for packing materials in a container comprising, in combination, a rotary pocket carrying member, means for rotating said pocket carrying member, a material receiving pocket carried by said member and rotatable as a whole therewith, the rotatable pocket including a pair of side plates and at least two pocket forming members movable between said side plates from an extended position in which the pocket is of maximum capacity to a contracted position in which the pocket is approximately of the size and shape of the container in which the material is to be packed, and means for moving said pocket forming members while said pocket carrying member is rotated.

13. A machine in accordance with claim 12 in which the means for moving said pocket forming members includes means for moving one of said pocket forming members substantially to its contracted position before the other movable pocket forming member is moved to any substantial extent toward its contracted position.

14. A machine in accordance with claim 12 in which the means for moving said pocket forming members includes means for moving one of said pocket forming members substantially to its contracted position before the other movable pocket forming member is moved to any substantial extent toward its contracted position and in which the side plates each has an opening with the openings being in alignment with each other, a piston rotating with said pocket carrying member and normally closing one of said openings and a container rotating with said pocket carrying member and normally closing the other of said openings.

15. A machine for packing materials in a container comprising, in combination, at least three pocket forming members at least two of which are movable, said pocket forming members when open presenting substantially a platform of enlarged area upon which material to be packed may be deposited, means for moving one of said movable pocket forming members toward a contracted position to gather the material and confine it to a smaller cross-sectional area, and means for moving another of said movable pocket forming members toward a contracted position after the material has been at least partially gathered and confined by the first movable pocket forming member, the movement of said other pocket forming member decreasing to a substantial extent the cross-sectional area which the material may occupy and compressing the material into substantially the cross-sectional area and shape of the container.

16. A machine in accordance with claim 15 in which the movable pocket forming members move between and in contiguous relation to a pair of side plates and in which the pocket forming members together with the side plates are rotated about a central axis.

17. A machine in accordance with claim 15 in which the first movable member upon closing forms a complete enclosure around the material, and in which the second movable member upon movement decreases the size of said enclosure.

18. A machine for packing materials in a container comprising, in combination, at least three pocket forming members adapted to form a shaping and compression chamber for the material, means for rotating said pocket forming members about a horizontal axis, at least one of said members being fixed and having a straight side wall which extends approximately parallel to a radius from said axis and terminates remote from said axis in a portion contoured in accordance with a part of the periphery of the container, a second member movable with respect to said first member and having a straight side wall terminating in a part contoured in accordance with a part of the periphery of the container, means for moving said second member from an expanded position in which said straight side walls are approximately at right angles to each other to a position such that said straight side walls are parallel to but spaced from each other and the contoured parts fit together, a second movable member closing the space between said straight side walls and having a part contoured in accordance with a part of the container, and means for moving said second movable member in an approximately radial direction between said straight side walls to compress the material to the size and shape of the container.

19. A machine in accordance with claim 18 in which the means for moving the movable members are timed with relation to the rotation about said axis so that the right angle retracted relation of said side walls occurs when said members lie above said axis.

20. A machine in accordance with claim 18 in which a hopper is provided above said axis and means are provided to feed the material to be packed in successive batches to said hopper, each batch being the approximate weight required to fill one container, a closure for the bottom of said hopper, the means for moving the movable members, the means for opening and closing said closure and the means for feeding the batches to the hopper being in timed relation to each other whereby the pocket forming members reach a position above said axis and below said hopper with the movable pocket forming members in their right angle relation when the closure is opened to discharge a batch of material into the pocket forming members.

21. A machine for packing materials in containers comprising, in combination, a hopper having an inlet and an outlet and having a movable closure valve adjacent the bottom thereof completely closing said outlet, a conveyor, means including segregating elements incorporated in the conveyor for depositing the materials in the hopper inlet in segregated successive batches, a plurality of sets of pocket forming members movable below said hopper to receive material from the hopper when said closure valve is opened, means for driving said sets of pocket forming members and said conveyor in timed relation to each other, and means for opening and closing said closure valve after the deposit of a segregated batch by said segregating elements in said hopper and in timed relation to the movement of said pocket forming members so that the segregated batches are deposited in successive pocket forming members.

22. A machine in accordance with claim 21 in which the conveyor is provided with a series of measuring devices separated from each other and each adapted to hold the approximate quantity of material to be placed in a container.

23. A machine in accordance with claim 21 in which the sets of pocket forming members are rotated about a central horizontal axis and a container turret is rotated about the same axis as the pocket forming members with the containers in alignment therewith.

24. A machine in accordance with claim 21 in which the sets of pocket forming members form a unit rotatable about a horizontal axis with said unit having a plurality of trip members and said closure valve having a depending member actuated by said trip members to actuate the closure member.

25. A machine for packing materials in containers comprising, in combination, a hopper having a closure valve adjacent the bottom thereof, an endless conveyor, means for driving said conveyor, a plurality of measuring compartments carried by said conveyor and having open tops with the compartments depositing the material in said hopper in successive batches, an apron extending along said conveyor on each side thereof upon which the material to be packed is deposited, a trough in which the upper run of the conveyor is supported, the margins of the open ends of the compartments being substantially flush with the upper surface of the aprons whereby an operator adjacent the conveyor may fill the successive measuring compartments to approximately the same level with the material on the aprons and means for opening and closing said closure valve in timed relation to the speed of movement of the compartments.

References Cited in the file of this patent
UNITED STATES PATENTS

| | | |
|---|---|---|
| 262,575 | Crosby | Aug. 15, 1882 |
| 1,235,680 | Greco | Aug. 7, 1917 |
| 1,891,830 | Nicholson | Dec. 20, 1932 |
| 1,891,870 | Dodge | Dec. 20, 1932 |
| 2,044,813 | Rooney | June 23, 1936 |
| 2,180,349 | DeBack | Nov. 21, 1939 |
| 2,189,831 | Paynter et al. | Feb. 13, 1940 |
| 2,475,422 | Carruthers | July 5, 1949 |
| 2,578,833 | Pearson | Dec. 18, 1951 |